United States Patent [19]

Dietrich

[11] Patent Number: 4,884,821
[45] Date of Patent: Dec. 5, 1989

[54] COLLET CHUCK

[76] Inventor: Otto E. Dietrich, 617 W. Jackson St., Morton, Ill. 61550

[21] Appl. No.: 261,542

[22] Filed: Oct. 24, 1988

[51] Int. Cl.$^4$ .............................................. B23B 31/20
[52] U.S. Cl. ..................................... 279/1 A; 279/51; 279/53
[58] Field of Search ............... 279/1 A, 1 ME, 51, 53, 279/52

[56] References Cited

U.S. PATENT DOCUMENTS

| | | | |
|---|---|---|---|
| 2,434,600 | 1/1948 | Swenson | 409/224 X |
| 2,574,754 | 11/1951 | Peters | 279/51 |
| 3,746,353 | 7/1973 | Allen | 279/1 A X |
| 4,218,165 | 8/1980 | Riddersholm | 409/225 |

FOREIGN PATENT DOCUMENTS

| | | | |
|---|---|---|---|
| 339027 | 7/1959 | Switzerland | 279/51 |
| 627016 | 7/1949 | United Kingdom | 279/51 |

Primary Examiner—Steven C. Bishop
Attorney, Agent, or Firm—Sixbey, Friedman, Leedom & Ferguson

[57] ABSTRACT

A collet chuck having a tubular housing with the inside diameter tapering outwardly at one end to match the taper of an inserted collet, threads on the reduced outside diameter of the housing at this same end for a collet closer or disc tightener to screw on. This collect closer is in the shape of a disc with knurled outer surface, and radial holes spaced in this outer surface so a lever can be inserted in any of these holes to assist in screwing the disc on the housing. A section of the inside diameter of the disc is threaded, the remaining part is an enlarged recess. When the disc is screwed on the housing, a needle thrust bearing and the flat ring of a rod assembly is loosely positioned in the recess of the disc tightener. A lock ring that slides on the larger diameter of the housing is fastened to the disc tightener to form a closed pocket with the ring and bearing inside. Rods fastened to the flat ring and sliding in axial holes through the wall section of the larger diameter of the housing, have a flange nut fastened to the rod ends protruding from the housing. This flange nut slides in the enlarged diameter end of the housing and has an internal threaded diameter for the collet to screw into. With the collet in place, any movement of the disc tightener will transfer to the collet, causing the collet to move in and out of the housing. Thus the collet can clamp or release a workpiece. A threaded plunger screwed through an axial hole in the wall of the housing, has a spring actuated tip to fit in the groove of the collet to prevent the collet from rotating, but to allow it to slide in and out of the housing.

13 Claims, 1 Drawing Sheet

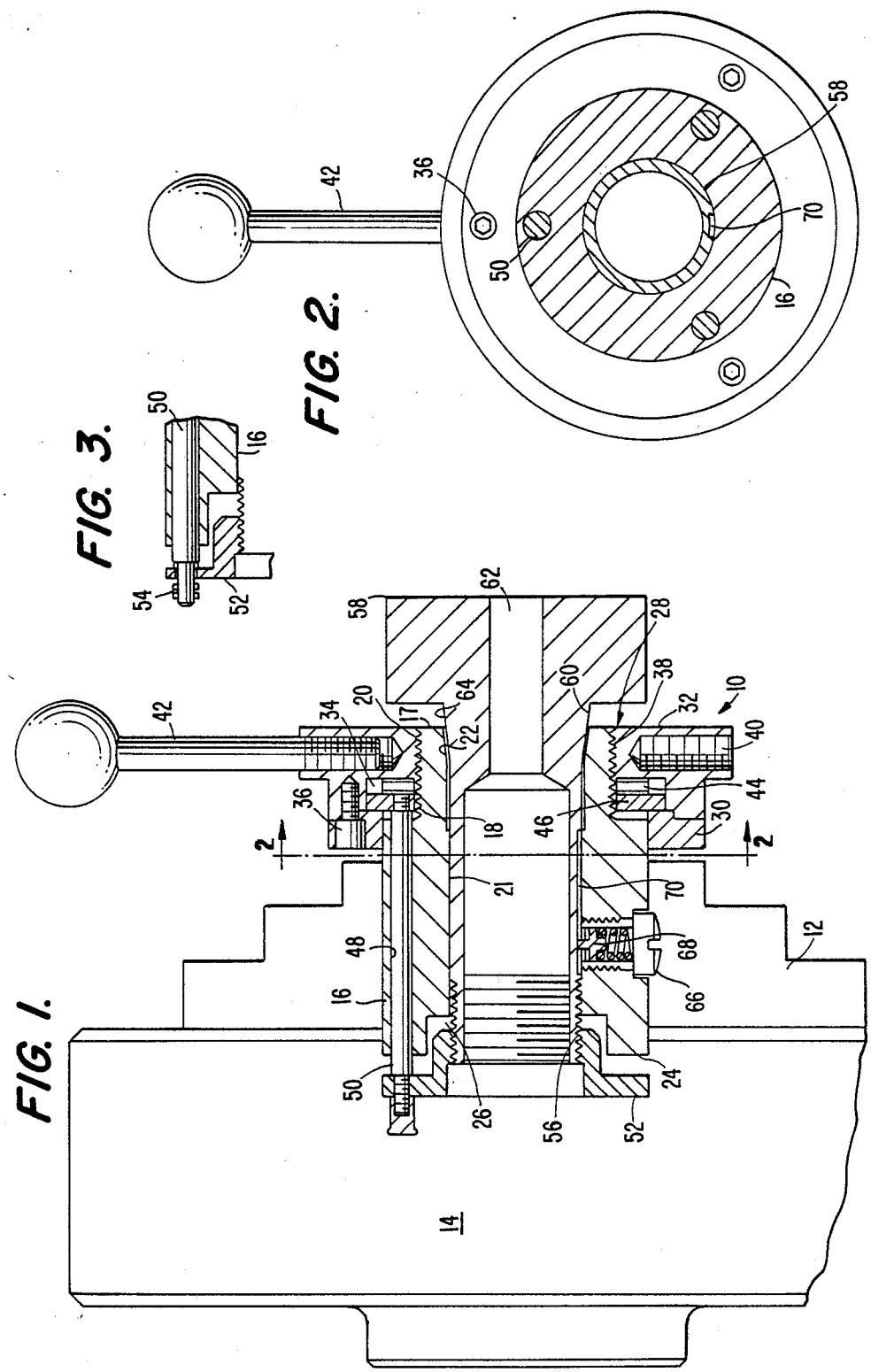

COLLET CHUCK

BACKGROUND OF THE INVENTION

This invention relates generally to holding a workpiece in a lathe and more particularly, to a collet chuck attachment that can be clamped instantly in the chuck that is already on the lathe and thereby converting an ordinary engine lathe for production operation.

PRIOR ART

Collet chucks, have been used for many years in machine shops for production machining, including those that are designed to use a 5-C collet. Also, 5-C collet chuck attachments have been sold to change an engine lathe into a production machine. To make this change, it is necessary to remove the multiple jawed scroll chuck from the lathe and fasten a fixture on the front end of the lathe spindle and controls for the attachment on the front or rear or the lathe spindle. To remove and replace a large heavy multiple jawed scroll chuck is an awkward task and is usually done with the help of a hoist.

This invention eliminates all of this work because all that is necessary is to clamp it in the jaws of a scroll or similar chuck which is already on the lathe. A collet is then inserted in the housing and screwed into a nut that is fastened in the rear of the housing. A workpiece is inserted in the collet and the disc wheel is then screwed on the housing drawing the collet into the housing, which closes the collet hole, clamping the workpiece securely. When the disc wheel is unscrewed the collet is forced back out of the housing, releasing the workpiece.

A similar 5-C collet chuck now being marketed, uses a key to open and close the collet, which results in a tedious operation and an expensive design. Another chuck designed by the inventor, pushes the collet into the housing. This prevents the chuck from using a 5-C collet with a large head or clutch collet.

Many machine shops have large engine lathes designed to manufacture large and usually single piece parts. Unless this type of large machining is available, the large lathe is idle. To use this large lathe as a production machine would defeat the purpose of production machining.

The purpose of this collet chuck is to clamp it in the jaws of the large multiple jawed scroll chuck or similar chuck, select and insert a collet, place a workpiece in the collet and tighten the handwheel. After the workpiece is finish machined, the part is removed by unscrewing the handwheel, which forces the collet slightly out of the housing, releasing the workpiece. This chuck is designed to use clutch collets and other large head 5-C collets.

DISCLOSURE OF THE INVENTION

It is a primary object of the present invention to provide a novel and improved collet attachment for mounting a collet with an outwardly tapered first end into and out of the outwardly tapered end of a housing. A collar assembly connected at the outwardly tapered end of the housing and movable axially of the housing is directly connected by elongate rods to a collet receiving flange nut slidably mounted at the opposite end of the housing.

A still further object of the present invention is to provide a novel and improved collet attachment for moving a collet with an outwardly tapered first end into and out of the outwardly tapered end of a housing. A collar assembly mounted on the tapered end of the housing controls collet movement through elongate rods extending through axial openings in the housing between the collar assembly and a collet receiving flange nut slidably mounted at the opposite end of the housing. The collar assembly includes a rotatable tightener threaded upon the housing which operates to axially move a flat ring connected to one end of the elongated rods.

BRIEF DESCRIPTION OF THE DRAWINGS

FIG. 1 is a cross-sectional view of the assembled chuck clamped in the jaws of a multiple jawed scroll chuck. A 5-C collet with a large head is shown in place.

FIG. 2 shows a cross-sectional view taken at line 2—2 of FIG. 1

FIG. 3 is a sectional view of a second embodiment of the flange nut loosely fastened to the rods.

BEST MODE FOR CARRYING OUT THE INVENTION

The collet chuck attachment of the present invention indicated generally at 10 can be clamped into a normal chuck 12 on a lathe 14. The collet chuck attachment includes a tubular housing 16 having a first end 17 with a portion of reduced outer diameter 18 which bears threads 20. The inside diameter of an opening 21 through the tubular housing 16 is tapered outwardly at 22 to the end of the housing beneath the portion of reduced diameter 18. The tubular housing 16 further includes a second end 24 having a portion of enlarged inside diameter 26 formed therein.

A collar assembly 28 is threaded for rotation on the threads 20 of the tubular housing 16. This collar assembly includes a lock ring 30 which extends around the tubular housing 16 inwardly of the portion of reduced outer diameter 18, and which is mounted to slide on the housing. This lock ring cooperates with a disk-shaped tightener 32 formed to provide a pocket or recess 34 above the portion 18 of reduced outer diameter and between the lock ring and the disk-shaped tightener. The lock ring closes the recess 34 and is fastened to the disk-shaped tightener by suitable fasteners such as bolts 36.

The disk-shaped tightener 32 includes a threaded inside diameter section 38 which permits the disk-shaped tightener to be threaded onto the threads 20 of the tubular housing 16. The disk-shaped tightener is further provided with radially spaced lever receiving apertures 40 which are adapted to receive a lever 42 used to screw the collar assembly inwardly or outwardly on the threads 20 for the housing 16.

Mounted within the recess 36 is a needle thrust bearing 44 which engages a flat ring 46. The flat ring 46 is adapted to slide over the threads of the portion of reduced outer diameter 18 and extends outwardly beyond the tubular housing 16 to engage the lock ring 30. Thus, the flat ring is moved relative to the tubular housing as the collar assembly 28 is rotated on the thread 20.

The tubular housing 16 is provided with axially extending openings 48 which receive rods 50. The rods 50 slide in the axially extending openings 48 and are secured at one end to the flat ring 46. The opposite ends of the rods extend outwardly beyond the second end 24 of the tubular housing 16 and are connected to a flange nut 52. The flange nut may be loosely connected to the rods by means of pins 54 which extend through the ends of the rods, as shown in FIG. 3. The flange nut is adapted to slide in the portion of enlarged inside diameter 26 of the tubular housing 16, and includes an internal threaded diameter 56.

A collet 58 is inserted into the tubular housing 16 and has one end secured to the flange nut 52 by threading into the internal threaded diameter 56. The opposite end of the collet is a split, outwardly tapered end 60 which includes a collet opening 62. The split, outwardly tapered end 60 includes a tapered surface 64 which engages the tapered surface 32 of the tubular housing 16 as the collet is drawn into the housing.

As the collar assembly 28 is rotated on the threads 20, movement is transferred by the rods 50 to the flange nut 52 and the collet 58 causing the collet to move into or out of the tubular housing 16. The collet is prevented from rotating by a detent 66 which includes a spring pressed plunger 68 which rides in a groove 70 in the collet.

I claim:

1. A collet attachment for a lathe for receiving a collet with a split, outwardly tapered first end and a second end spaced from said first end comprising a housing with an opening therethrough for receiving said collet and having a first housing end, said opening tapering outwardly at said first housing end, a second housing end spaced from said first housing end, a collar assembly means mounted on said first housing end for limited axial movement relative to said housing, flange nut means mounted at the second housing end for axial movement relative thereto, said flange nut means being adapted to releasably receive the second end of said collet when the split, outwardly tapered first end thereof is positioned adjacent to the first housing end, and elongated rod means extending axially of said housing for axial movement relative thereto, one end of said elongated rod means being secured to said collar assembly means and a second end of said elongated rod means extending outwardly beyond the second end of said housing and being secured to said flange nut means.

2. The collet attachment of claim 1 wherein said housing includes an externally threaded portion at said first housing end, said collar assembly means being threaded to match the threads of said external threaded portion and being threaded upon said external threaded portion.

3. The collet attachment of claim 1 wherein said housing is provided with a plurality of openings extending axially therethrough, said rod means being mounted for sliding movement in said openings.

4. The collet attachment of claim 2 wherein said collar assembly means includes a tightener means having threads to match the threads of the external threaded portion at said first housing end, said tightener means being threaded for rotation on the external threaded portion, rod attachment means mounted on said first housing end and being adapted to move axially of said housing over the external threads of said external threaded portion, said rod means being secured to said rod attachment means to secure said rod attachment means against and said tightener means being mounted on said external threaded portion of said first housing end outboard of said rod attachment means and operative to engage and move said rod attachment means in opposite axial directions relative to said tubular housing as said tightener means is rotated in opposite directions on said external threaded portion.

5. The collet attachment of claim 4 wherein said housing is provided with a plurality of openings extending axially therethrough, said rod means being mounted for sliding movement in said openings.

6. The collet attachment of claim 5 wherein said collar assembly means includes bearing means mounted between said tightener means and said rod attachment means.

7. The collet attachment of claim 5 wherein said housing is substantially tubular in configuration, the external threaded portion at said first housing end being of reduced outer diameter relative to the outer diameter of the remainder of said housing.

8. The collet attachment of claim 7 wherein said collar assembly means includes a lock ring means mounted to slide on said housing inboard of said external threaded portion, said rod attachment means being mounted between said lock ring means and said tightener means and extending outwardly above said housing, said lock ring means being secured to said tightener means.

9. The collet attachment of claim 8 wherein said tightener means is formed to provide with said lock ring means an enclosed chamber therebetween, said rod attachment means being mounted in said enclosed chamber.

10. The collet attachment of claim 9 wherein bearing means are mounted in said chamber between said tightener means and said rod attachment means.

11. The collet attachment of claim 10 wherein said rod attachment means and tightener means are substantially ring-shaped in configuration.

12. The collet attachment of claim 7 wherein the opening in said housing is of increased diameter in an area at said second housing end, said flange nut means being adapted to move in the area of increased diameter at said second housing end.

13. The collet attachment of claim 12 wherein spring pressed detent means are mounted on said housing to project into the opening therethrough, said spring pressed detent means being adapted to engage and prevent rotation of said collet.

* * * * *